(12) United States Patent
Sun et al.

(10) Patent No.: US 9,556,324 B2
(45) Date of Patent: Jan. 31, 2017

(54) ANTI-SCORCH COMPOSITIONS, METHODS OF MAKING THE SAME, AND ARTICLES PREPARED FROM THE SAME

(75) Inventors: Yabin Sun, Shanghai (CN); Gary R. Marchand, Gonzales, LA (US); Xiang Yang Tai, Shanghai (CN); Shuwen Peng, Shanghai (CN); Shaoguang Feng, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 1344 days.

(21) Appl. No.: 13/497,537

(22) PCT Filed: Sep. 29, 2009

(86) PCT No.: PCT/CN2009/074310
§ 371 (c)(1),
(2), (4) Date: Mar. 22, 2012

(87) PCT Pub. No.: WO2011/038539
PCT Pub. Date: Apr. 7, 2011

(65) Prior Publication Data
US 2012/0178865 A1   Jul. 12, 2012

(51) Int. Cl.
*C08C 19/20*   (2006.01)
*C08J 3/24*   (2006.01)
(Continued)

(52) U.S. Cl.
CPC . *C08K 5/19* (2013.01); *C08K 3/06* (2013.01); *C08K 5/34* (2013.01); *C08K 5/378* (2013.01);
(Continued)

(58) Field of Classification Search
CPC ............. C08K 5/19; C08K 5/378; C08K 5/34; C08K 5/0025; C08K 5/3432; C08K 5/3445; C08K 5/39; C08K 5/47; C08K 3/06; C08C 19/22; C08C 19/20; C08J 3/24; C08L 23/16
(Continued)

(56) References Cited

U.S. PATENT DOCUMENTS 2,531,396 A   11/1950   Lawrence et al.
4,745,147 A   5/1988   Honsberg
(Continued)

FOREIGN PATENT DOCUMENTS

JP   09316238   12/1997
JP   2005247962   9/2005
(Continued)

OTHER PUBLICATIONS http://www.guidechem.com/reference/dic-1325.html; Nov. 2015.*
(Continued)

*Primary Examiner* — Roberto Rabago

(57) ABSTRACT

The invention provides a composition comprising at least the following:

A) interpolymer comprising, in polymerized form, ethylene, an α-olefin and a nonconjugated polyene;
B) sulfur;
C) at least one phase transfer catalyst (PTC) selected from the group consisting of the following:

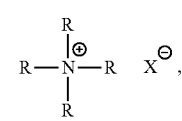

(1)

as described herein;

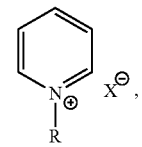

(2)

as described herein;

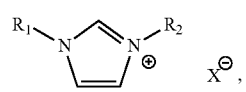

(3)

as described herein; and

D) at least one primary accelerator selected from the group consisting of the following:

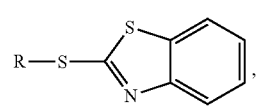

(a)

as described herein;

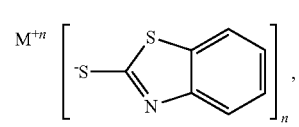

(b)

as described herein;

(Continued)

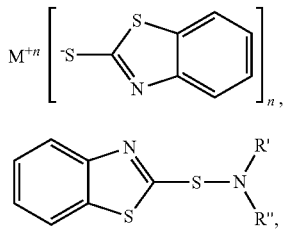

as described herein;

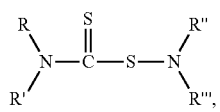

as described herein; and combinations thereof.

16 Claims, 1 Drawing Sheet

(51) Int. Cl.
| | |
|---|---|
| *C08K 5/19* | (2006.01) |
| *C08K 5/46* | (2006.01) |
| *C08K 3/06* | (2006.01) |
| *C08K 5/34* | (2006.01) |
| *C08K 5/378* | (2006.01) |
| *C08L 23/16* | (2006.01) |
| *C08L 91/00* | (2006.01) |

(52) U.S. Cl.
CPC ............. *C08L 23/16* (2013.01); *C08C 19/20* (2013.01); *C08J 3/24* (2013.01); *C08L 91/00* (2013.01); *C08L 2312/00* (2013.01)

(58) Field of Classification Search
USPC .............................. 525/332.1, 375, 378, 379
See application file for complete search history.

(56) References Cited

U.S. PATENT DOCUMENTS

| | | | |
|---|---|---|---|
| 4,861,842 A | 8/1989 | Cohen et al. | |
| 5,187,239 A * | 2/1993 | Parks et al. | ............... 525/329.3 |
| 6,025,428 A | 2/2000 | Day | |
| 6,322,721 B1 | 11/2001 | Yankner et al. | |
| 6,858,665 B2 | 2/2005 | Larson | |
| 2002/0180078 A1 | 12/2002 | Chauvin et al. | |
| 2006/0155077 A1 | 7/2006 | Galimberti et al. | |
| 2006/0205889 A1 | 9/2006 | Laakso et al. | |
| 2007/0078046 A1* | 4/2007 | Matsumura | ........... F16C 13/006 |
| | | | 492/56 |

FOREIGN PATENT DOCUMENTS

| | | |
|---|---|---|
| JP | 2006-290940 | * 10/2006 |
| JP | 2006290940 | 10/2006 |
| WO | 2004/052983 A1 | 6/2004 |

OTHER PUBLICATIONS https://en.wikipedia.org/wiki/EPDM_rubber; Jan. 2009.*
JP 2006-290940, Oct. 2006, machine translation.*
PCT/CN2009/074310, International Search Report and Written Opinion, Jul. 2010.
PCT/CN2009/074310, International Preliminary Report on Patentability, Apr. 2012.

* cited by examiner

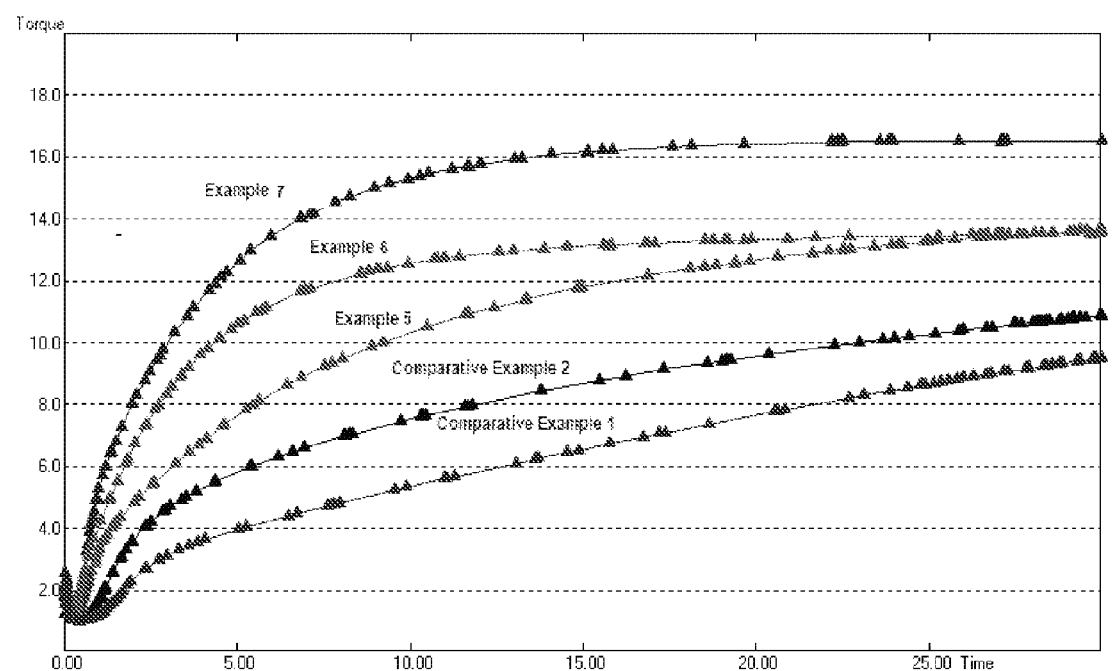

ANTI-SCORCH COMPOSITIONS, METHODS OF MAKING THE SAME, AND ARTICLES PREPARED FROM THE SAME

BACKGROUND OF THE INVENTION

Curing rate is an important vulcanization parameter, since it, in part, determines the time needed for the compound to cure (for example, t90). In the manufacture of vulcanized rubber articles, significant cost saving can be realized through a reduction of cure time. By using secondary accelerator (ultra accelerator), the rate of cure increased, the cure time required to meet minimum states of cure can be reduced. However, the loading of secondary accelerator lead to premature crosslinking (low ts2) during the compounding or processing stage of the rubber formulation. The ethylene/propylene/diene (EPDM) polymers that contain low levels of diene, usually require very active cure compositions to reach high curing rates in certain applications, such as sponge weather strip. An active curing composition usually includes primary and secondary accelerators, which can lead to premature crosslinking during polymer compounding and processing.

It is desired that a rubber formulation maintain chemical stability during processing of the formulation, such that minimal vulcanization occurs prior to formation of the finished cured article. Theses compositions are especially needed in applications that require high cure rates, such for use in sponge weather strips.

U.S. Pat. No. 5,187,239 is directed to a sulfur vulcanizable rubber composition comprising an elastomer containing olefinic unsaturation, a vulcanizing agent, an accelerator, and from about 0.05 phr to about 5.0 phr of a methyl trialkyl ammonium salt. However, the shorter alky group, such as methyl group, in the ammonium salt decrease its acceleration on the curing rate, due to its relative lower transferability of curing agent into the rubber. Furthermore, the use of both primary and secondary accelerators to accelerate the curing rate results in poor anti-scorch property during compounding.

U.S. Pat. No. 4,861,842 is directed to a cure system for a sulfur vulcanizable rubber. The cure system comprises the following: a sulfenamide accelerator, a guanidine accelerator, a thiuram accelerator, a mercapto benzothiazyl disulfide, a sulfur vulcanizing agent, an N-cyclohexylthio-phthalimide, a zinc compound, and a methyltrialkyl ammonium salt. Again, the shorter alky group, such as methyl group, in the ammonium salt decreases its acceleration on the curing rate, due to its relative lower transferability of curing agent into the rubber. Furthermore, the use of both primary and secondary accelerators to accelerate the curing rate results in poor anti-scorch property during compounding.

U.S. Publication No. 2002/0180078 is directed to a rubber composition, which is free of precursor of at least one carcinogenic nitrosamine, and which contains at least one rubber selected from natural rubber, polyisoprene, polybutadiene, styrene-butadiene, styrene-isoprene and butadiene-isoprene copolymers, or styrene-butadiene-isoprene terpolymers. The composition comprises a vulcanization system containing the following: a) sulfur, b) at least one accelerator compound selected from the group consisting of benzothiazyl disulfide and mercaptobenzothiazole, c) at least one ultra-accelerator compound selected from the group consisting of tetrabenzylthiuram disulfide and zinc dibenzyldithiocarbamate; d) at least one vulcanization amine activator selected from the group consisting of amines, guanidines, aldehyde and amine condensates, and quaternary ammonium salts. Furthermore, the use of both primary and secondary accelerators to accelerate the curing rate results in poor anti-scorch property during compounding.

European Patent Application No. 0982355A1 is directed to rubber formulations containing an accelerator compound, comprised of an organic-based quaternary ammonium salt. Preferably, the accelerator compound is a quaternary ammonium salt selected from the group consisting of trimethylbetahydroxyethyl ammonium hydroxide (TMBHEAH), carboxymethyltrimethyl ammonium hydroxide (CMTAH), methylallylbenzylphenol ammonium iodide, benzyltriethyl ammonium chloride, hexadecyltrimethyl ammonium chloride imidazolium compounds. More preferred accelerators are comprised of a choline based compound, comprised of trimethylbetahydroxyethyl ammonium hydroxide and/or of a betaine compound, comprised of carboxymethyltrimethyl ammonium hydroxide.

Quaternary ammonium salts have been used as additives for rubber composites. For example, as a dispersing agent for fillers, such as silica, and as modifiers for nano clay.

U.S. Pat. No. 6,025,428 is directed to a method of compounding silica in a tire tread composition, comprising the following steps: (a) mechanically mixing, in a plurality of mixing stages the following: a rubber comprising a conjugated diene, a silica dispersing agent for enhancing the distribution of the silica in the rubber, and a coupling agent for chemical bonding of the rubber to the silica; and (b) mixing the rubber and the silica with the coupling agent, prior to, or contemporaneously with, mixing the dispersing agent the rubber. The dispersing agent comprising a quaternary ammonium compound.

Japanese Patent Application No. P2005-247962A is directed to a silica-compounded rubber formulation comprising at least one diene rubber, silica, and an organic ammonium compound containing at least one allyl or benzyl group.

Japanese Patent Application No. 2006-290940 is directed to a tread rubber composition, comprising a rubber component, a filler, and an onium salt. The invention is disclosed as providing a tire tread rubber composition for reduced fuel consumption, which lowers the tan δ at 60° C., without substantial detriment to other properties.

Japanese Patent Application No. H9-316238 is directed to a composition for compounding a rubber, comprising an organic phosphonium salt or an organic ammonium salt, and one or more fillers. The salt can be easily, uniformly kneaded when it is added into the rubber.

U.S. Pat. No. 2,531,396 is directed to a reinforced elastomer, comprising, an elastomer base, selected from a group consisting of natural rubber, butadiene rubber copolymers and polychloroprene rubbers; and a modified clay, originally exhibiting a base-exchange capacity from 10 to 100, in which the inorganic cation has been replaced by a substituted organic onium base to the extent of at least 15 me/100 g of the clay, or replaced by a substituted organic ammonium base to the extent of at least 15 me/100 g. of clay.

U.S. Pat. No. 6,858,665 is directed to a process of preparing a rubber composition, which contains a dispersion of intercalated and at least partially an exfoliated smectite clay. The smectite clay is intercalated and exfoliated, in situ, within an elastomer host. The process comprises blending the following at least one hydrocarbon diene-based elastomer; a smectite clay selected from at least one of montmorillonite clay and hectorite clay and mixtures thereof; a quaternary ammonium salt selected from methyl trialkyl ammonium chloride, trimethyl alkyl ammonium chloride, dimethyl dialkyl ammonium chloride, dimethyl alkyl allyl ammonium chloride and dimethyl diallyl ammonium chloride; and at least one additional reinforcing filler comprised of at least one of carbon black, synthetic amorphous silica or silica treated carbon black and mixtures thereof. A coupling agent is mixed, therewith, subsequent to said intercalation of the smectite clay, and after at least a partial exfoliation of the intercalated clay to form exfoliated clay platelets.

Additional rubber formulations are disclosed in International Publication No. WO 2004/052983.

As discussed above, there remains a need for improved rubber formulations which have enhanced cure rates at specified cure temperatures, and maintain stability (scorch resistance) at processing temperatures. There is a need for cure compositions that provide high cure rates, while minimizing premature crosslinking under standard processing temperatures, and which can be used in applications that require high cure rates. These needs and others have been met by the following invention.

SUMMARY OF THE INVENTION

The invention provides a composition comprising at least the following:

A) interpolymer comprising, in polymerized form, ethylene, an α-olefin and a nonconjugated polyene;
B) sulfur;
C) at least one phase transfer catalyst (PTC) selected from the group consisting of the following:

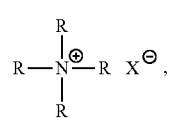
(1)

wherein each R group is, independently, an alky group having from 4 to 32 carbon atoms, and X is a halogen ion;

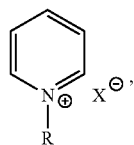
(2)

wherein the R group is an alky group having from 4 to 32, and X is a halogen ion;

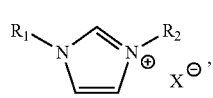
(3)

wherein R1 is the alky group having from 1 to 4 carbon atoms, R2 is an alkyl group having from 1 to 32 carbon atoms, and X is a halogen ion; and combinations of (1), (2) and (3); and D) at least one primary accelerator selected from the group consisting of the following:

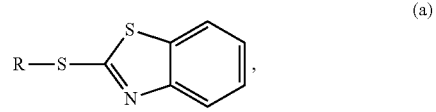
(a)

wherein R is H, or a heterocyclic substituent;

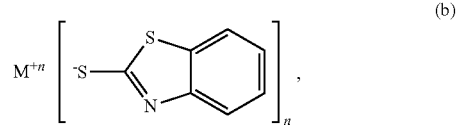
(b)

wherein M is $Zn^{2+}$, $K^+$, $Na^+$, $Cu^{2+}$ or an alkyl ammonium;

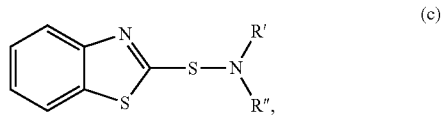
(c)

wherein R' and R" are each, independently, H, an alkyl, a cyclic alkyl, an aromatic, or a heterocyclic substituent, or wherein R' and R" together form a cyclic structure;

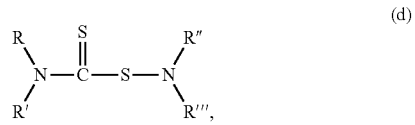
(d)

wherein R, R', R" and R'" are each, independently, H, an alkyl, a cyclic alkyl, an aromatic, or a heterocyclic substituent; or wherein R and R' are each, independently, H, an alkyl, a cyclic alkyl, an aromatic, or a heterocyclic substituent, and R" and R'" together form a cyclic structure; or wherein R" and R'" are each, independently, H, an alkyl, a cyclic alkyl, an aromatic, or a heterocyclic substituent, and R and R' together form a cyclic structure; or wherein R" and R'" together form a cyclic structure and R and R' together form a cyclic structure;
and combinations thereof.

BRIEF DESCRIPTION OF THE DRAWINGS

FIG. 1 depicts the curing curve recorded form MDR test of several EPDM-based formulations (the relationship between torque of the sample and testing time).

DETAILED DESCRIPTION

It has been discovered that the inventive compositions have a temperature dependent acceleration effect on the vulcanization of polymers, such as EPDM. The inventive compositions provide a good balance between cure rate, scorch resistance (resistance to premature crosslinking) at processing temperatures. Such compositions can be used to increase productivity of cured end products, and can be used to form finished article with improved properties and appearance.

As discussed above, the invention provides a composition comprising at least the following:

A) interpolymer comprising, in polymerized form, ethylene, an α-olefin and a nonconjugated polyene;
B) sulfur;
C) at least one phase transfer catalyst (PTC) selected from the group consisting of the following:

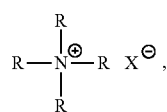
(1)

wherein each R group is, independently, an alky group having from 4 to 32 carbon atoms, preferably from 6 to 32 carbon atoms, and more preferably from 8 to 32 carbon atoms, and X is a halogen ion, preferably Cl⁻ or Br⁻;

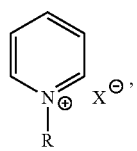
(2)

wherein the R group is an alky group having from 4 to 32 carbon atoms, preferably 6 to 32 carbon atoms, and more preferably 8 to 32 carbon atoms, and X is a halogen ion, preferably Cl⁻ or Br⁻;

(3)

wherein R1 is the alky group having from 1 to 4 carbon atoms, preferably from 2 to 4 carbon atoms, R2 is an alkyl group having from 1 to 32 carbon atoms, preferably from 4 to 32 carbon atoms, and X is a halogen ion, preferably Cl⁻ or Br⁻; and combinations of (1), (2) and (3); and D) at least one primary accelerator selected from the group consisting of the following:

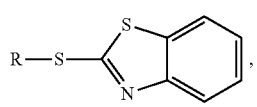
(a)

wherein R is H, or a heterocyclic substituent;

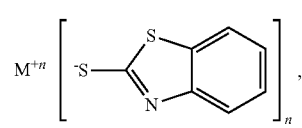
(b)

wherein M is $Zn^{2+}$, $K^+$, $Na^+$, $Cu^{2+}$ or an alkyl ammonium;

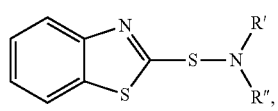
(c)

wherein R' and R" are each, independently, H, an alkyl, a cyclic alkyl, an aromatic, or a heterocyclic substituent, or wherein R' and R" together form a cyclic structure;

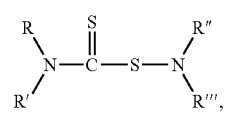
(d)

wherein R, R', R" and R''' are each, independently, H, an alkyl, a cyclic alkyl, an aromatic, or a heterocyclic substituent, or wherein R and R' are each, independently, H, an alkyl, a cyclic alkyl, an aromatic, or a heterocyclic substituent, and R" and R''' together form a cyclic structure; or wherein R" and R''' are each, independently, H, an alkyl, a cyclic alkyl, an aromatic, or a heterocyclic substituent, and R and R' together form a cyclic structure; or wherein R" and R''' together form a cyclic structure and R and R' together form a cyclic structure;

and combinations thereof.

In one embodiment, the phase transfer catalyst (PTC) is selected from the group consisting of (1), (2) and (3).

In one embodiment, the primary accelerator is selected from the group consisting of (a), (b), (c) and (d).

In one embodiment, the phase transfer catalyst (PCT) is

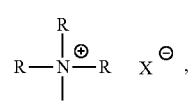
(1)

wherein each R group is, independently, an alky group having from 4 to 32 carbon atoms, preferably from 6 to 32 carbon, and more preferably from 8 to 32 carbon atoms, and X is a halogen ion, preferably Cl⁻ or Br.

In a further embodiment, the PTC is selected from one of the following below, as shown in Table A.

TABLE A

| Name | Structure | |
|---|---|---|
| Tetra butyl ammonium bromide (TBAB) | R–N⁺(R)(R)R  Br⁻, R = C4 | |
| Tetra hexyl ammonium bromide (THAB) | R–N⁺(R)(R)R  Br⁻, R = C6 | |
| Tetra octyl ammonium bromide (TOAB) | R–N⁺(R)(R)R  Br⁻, R = C8 | |
| Tetra dodecyl ammonium bromide (TDAB) | R–N⁺(R)(R)R  Br⁻, R = C12 | |
| Tetra butyl ammonium iodide (TBAI) | R–N⁺(R)(R)R  I⁻, R = C4 | |
| Tetra butyl ammonium chloride (TBAC) | R–N⁺(R)(R)R  Cl⁻, R = C4 | |

In one embodiment, the phase transfer catalyst (PTC) is tetra octyl ammonium chloride.

In one embodiment, the phase transfer catalyst (PTC) is

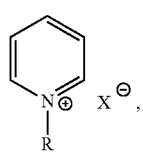

(2)

wherein the R group is an alky group having from 4 to 32 carbon, preferably from 6 to 32 carbon, and more preferably from 8 to 32 carbon atoms, and X is a halogen ion, preferably Cl⁻ or Br⁻. In a further embodiment, the PTC is selected from one of the following below, as shown in Table B.

TABLE B

| Name | Structure |
|---|---|
| Hexadecyl pyridinium bromide (HDPB) | pyridinium, Br⁻, R = C16 |
| Hexadecyl pyridinium chloride (HDPC) | pyridinium, Cl⁻, R = C16 |
| Octyl pyridinium chloride (OP) | pyridinium, Cl⁻, R = C8 |

In one embodiment, the phase transfer catalyst (PTC) is

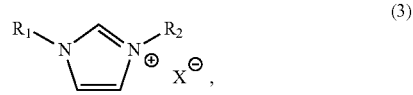

(3)

wherein R1 is the alky group having from 1 to 4 carbon atoms, preferably from 2 to 4 carbon atoms, R2 is an alkyl group having from 1 to 32 carbon atoms, preferably from 4 to 32 carbon atoms, and X is a halogen ion, preferably Cl⁻ or Br⁻. In a further embodiment, the PTC is selected from one of the following below, as shown in Table C.

TABLE C

| Name | Structure |
|---|---|
| 1-methyl-3-octyl imidazol chloride | imidazolium, X⁻, R1 = C1, R2 = C8 |
| 1-methyl-3-butyl imidazol chloride | imidazolium, X⁻, R1 = C1, R2 = C4 |
| 1-methyl-3-ethyl imidazol chloride | imidazolium, X⁻, R1 = C1, R2 = C2 |

In one embodiment, the primary accelerator, Component D, is selected from the group consisting of the following:

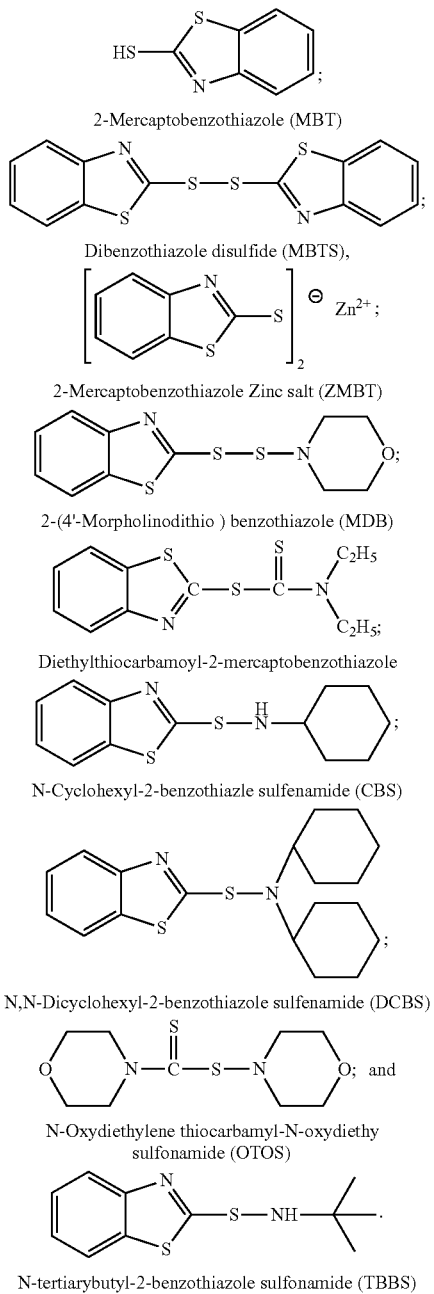

2-Mercaptobenzothiazole (MBT)

Dibenzothiazole disulfide (MBTS),

2-Mercaptobenzothiazole Zinc salt (ZMBT)

2-(4'-Morpholinodithio) benzothiazole (MDB)

Diethylthiocarbamoyl-2-mercaptobenzothiazole

N-Cyclohexyl-2-benzothiazle sulfenamide (CBS)

N,N-Dicyclohexyl-2-benzothiazole sulfenamide (DCBS)

N-Oxydiethylene thiocarbamyl-N-oxydiethy sulfonamide (OTOS)

N-tertiarybutyl-2-benzothiazole sulfonamide (TBBS)

In one embodiment, Component D is selected from the group consisting of the following: benzothiazoles (for example, MBT, MBTS and MDB) and sulfenamides (for example, CBS and DCBS).

In one embodiment, the accelerator, Component D, is selected from the group consisting of MBT, MBTS, MDB, ZMBT, CBS, DCBS and combinations thereof.

In one embodiment, the accelerator, Component D, is selected from the group consisting of the following: MBT, METS, ZMBT, CBS, and DCBS.

In one embodiment, Component D is 2-mercaptobenzothiazole (MBT).

The present invention allows for the various combinations of phase transfer catalyst and primary accelerator.

In one embodiment, the interpolymer comprises, in polymerized form from 0.1 to 11 weight percent, preferably from 2 to 10 weight percent, more preferably from 4 to 8 weight percent, of the nonconjugated polyene, based on the weight of the interpolymer.

In one embodiment, the composition further comprises an interpolymer comprising, in polymerized form, ethylene, an α-olefin and a nonconjugated polyene. In a further embodiment, the interpolymer is an EPDM. In yet a further embodiment, the diene is ENB.

In a preferred embodiment, the interpolymer is an EPDM. In yet a further embodiment, the diene is ENB. In a further embodiment, interpolymer comprises, in polymerized form from 0.1 to 11 weight percent, preferably from 2 to 10 weight percent, more preferably from 4 to 8 weight percent, of the ENB, based on the weight of the interpolymer.

In one embodiment, the sulfur, Component B, is selected from the group consisting of powder sulfur, insoluble sulfur, surface treated sulfur, polymeric polysulfide, and sulfur olefin adducts. In a further embodiment, the sulfur is selected from elemental sulfur, polymeric sulfur, or combinations thereof. In a further embodiment, the sulfur is polymeric sulfur.

Sulfur (Component B) can be an elemental sulfur or a polymeric sulfur. Elemental sulfur can be a crystalline elemental sulfur or an amorphous elemental sulfur, and either type can be in pure form or supported on an inert carrier. An example of a supported sulfur is Rhenogran S-80 from Rhein Chemie. There are different states of elemental sulfur, crystalline elemental sulfur or an amorphous elemental sulfur. Polymeric sulfur, also called insoluble sulfur, is used to solve the migration issue of sulfur after compounding. Examples of commercial polymeric sulfurs include, but are not limited to, Rhenogran S-80 from Rhein Chemie and "IS-HS" grades of sulfur available from Shanghai Jinghai Chem. Co. Ltd.

In one embodiment, the composition further comprises at least one compound selected from the group consisting of the following: zinc stearate, zinc maleate, zinc carbonate, magnesium carbonate, calcium hydroxide, calcium oxide, oleic acid, linoleic acid, lauric acid, caprylic acid, soybean fatty acid, zinc laurate, maleic alkyl, and maleic acid. In a further embodiment, the compound is zinc oxide (ZnO).

In one embodiment, the composition further comprises filler. In a further embodiment, the filler is selected from the group consisting of carbon black, calcium hydroxide, titanium dioxide, calcium carbonate, talc, and clays. In a further embodiment, the filler is carbon black.

In one embodiment, the composition further comprises extender oil. In a further embodiment, the extender oil is selected from the group consisting of the following: mineral oil, engine oil, heavy diesel oil, industrial Vaseline, scale paraffin, petroleum resins, coal tar, castor oil, and soy bean oil. In a further embodiment, the oil is paraffin oil.

In one embodiment, the composition comprises fatty acid such as stearic acid, lauric acid, oleic acid and behenic acid.

In one embodiment, Component C (PTC) is present in an amount from 0.01 to 10 phr, preferably from 0.05 to 5 phr, and more preferably from 0.1 to 1 phr (based on 100 parts of polymer, preferably EPDM, in the composition).

In one embodiment, Component D (primary accelerator) is present in an amount from 0.01 to 10 phr, preferably from 0.05 to 5 phr, and more preferably from 0.1 to 5 phr (based on 100 parts of polymer, preferably EPDM, in the composition).

In one embodiment, Component B (sulfur) is present in an amount from 0.01 to 20 phr, preferably from 0.05 to 10 phr, and more preferably from 0.1 to 5 phr (based on 100 parts of polymer, preferably EPDM, in the composition).

In a preferred embodiment, the composition does not contain a secondary accelerator. Examples of secondary accelerators include dithiocarbamates, such as the following: zinc dibutyl dithiocarbamate (ZDBC), zinc dimethyl dithiocarbamate (ZDMC), zinc diethyl dithiocarbamate (ZDEC), tellurium diethyl dithiocarbamate (TDEC), zinc dibenzyl dithiocarbamate (ZBDC), zinc N-ethyl-N-phenyldithiocarbamate (ZEPC or PX), and the like. Thiurams, such as the following: tetramethyl thiuram disulfide (TMTD), tetraethyl thiuram disulfide (TETD), tetrabutyl thiuram disulfide (TBzTD), dipentamethylene thiuramtetrasulfide (DPTT), tetramethyl thiuram mono sulfide (TMTM), diisobutyl thiuram disulfide (TiBD), and the like.

In one embodiment, the composition has a ts2 value at 121° C. of greater than 20 minutes, and preferably greater than 22 minutes.

In one embodiment, the composition has a cure rate, at 177° C., of greater than 0.8 lb·inch/min, and preferably greater than 1 lb·inch/min.

In one embodiment, the composition has a cure rate, at 200° C., of greater than 2.2 lb·inch/min, and preferably greater than 3.0 lb·inch/min.

The invention also provides a cured polymer formed from an inventive composition.

The invention also provides an article comprising at least one component formed from a cured polymer.

The invention also provides an article comprising at least one component formed from an inventive composition.

An inventive composition may comprise a combination of two or more embodiments as described herein.

An inventive article may comprise a combination of two or more embodiments as described herein.

Ethylene/α-Olefin/Nonconjugated Polyene Interpolymer

The ethylene/α-olefin/nonconjugated polyene interpolymers of the present invention have polymerized therein C2 (ethylene), at least one α-olefin monomer, and a nonconjugated diene monomer.

The α-olefin is preferably a C3-C20 aliphatic compound, preferably a C3-C16 aliphatic compound, and more preferably a C3-C10 aliphatic compound. A preferred C3-C10 aliphatic α-olefin is selected from the group consisting of propylene, 1-butene, 1-hexene and 1-octene, and more preferably propylene. In a preferred embodiment, the interpolymer polymer is an EPDM interpolymer, and further an EPDM terpolymer. In a further embodiment, the diene is 5-ethylidene-2-norbornene (ENB).

In one embodiment, the nonconjugated polyene is a C6-C15 straight chain, branched chain or cyclic hydrocarbon diene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB. In a further embodiment, the ENB is present in an amount from 1 to 8 weight percent, preferably from 4 to 8 weight percent, based on the weight of the polymer.

In one embodiment, the ethylene/α-olefin/nonconjugated polyene interpolymer comprises, in polymerize form, from 44 to 56 weight percent, preferably from 46 to 54 weight percent, and more preferably from 48 to 52 weight percent ethylene, based on the weight of the interpolymer. In a further embodiment, the interpolymer is an EPDM. In a further embodiment, the diene is ENB.

In one embodiment, the ethylene/α-olefin/nonconjugated polyene interpolymer comprises, in polymerize form, from 5 to 10 weight percent, preferably from 6 to 9 weight percent, and more preferably from 7 to 8 weight percent ENB, based on the weight of the interpolymer. In a further embodiment, the interpolymer is an EPDM.

In one embodiment, the ethylene/α-olefin/nonconjugated polyene interpolymer has a Mooney Viscosity (ML 1+4 at 125° C.) from 50 to 120, preferably from 55 to 100, and more preferably from 60 to 80. In a further embodiment, the interpolymer is an EPDM. In a further embodiment, the diene is ENB.

An ethylene/α-olefin/nonconjugated polyene interpolymer may comprise a combination of two or more embodiments as described herein.

An ethylene/alpha-olefin/diene interpolymer may comprise a combination of two or more embodiments is described herein.

An EPDM interpolymer may comprise a combination of two or more embodiments is described herein.

Additives

An inventive composition may comprise one or more additives. Suitable additives include, but are not limited to, fillers, antioxidants, UV stabilizers, vulcanizing agents, foaming agents, flame retardants, plasticizers, colorants or pigments, and combinations thereof.

Fillers include, but are not listed to, carbon black; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; phenolformaldehyde, polystyrene, and poly(alphamethyl)-styrene resins, natural fibers, synthetic fibers, and the like.

Plasticizers include, but are not limited to, petroleum oils, such as ASTM D2226 aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

Antioxidants and antiozonants additives include, but are not limited to, hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylphenylene-diamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, and the like.

Foaming agents useful in making foam structures include, but are not limited to, decomposable chemical foaming agents. Such chemical foaming agents decompose at elevated temperatures to form gases or vapors to blow the polymer into foam form. The agent preferably takes a solid form so it is conveniently dry-blended with the polymer material. Chemical foaming agents include, but are not limited to, azodicarbonamide, azodiisobutyro-nitrile, barium azodicarboxylate, N,N'-dimethyl-N,N'-dinitrosoterephthalamide, N,N'-dinitrosopentamethylenetetramine, benzenesulfonhydrazide, 4,4-oxybenzene sulfonyl semicarbazide, p-toluene sulfonyl semicarbazide, p,p'-oxybis-(benzenesulfonyl hydrazide), 3,3'-disulfonhydrazide-diphenylsulfone, azobisisobutyronitrile, azobisformamide and the like. In one embodiment, the foaming agent is azodicarbonamide. These foaming agents may be used alone, or in admixture of two or more. In one embodiment, the foaming agent is an inorganic foaming agent, such as ammonium carbonate, sodium bicarbonate, anhydrous sodium nitrate and the like. Additional teachings to chemical foaming agents are seen in C. P. Park, Supra, pp. 205-208, and F. A. Shutov, "Polyolefin Foam", Handbook of Polymer Foams and Technology, pp. 382-402, D. Klemper and K. C. Frisch, Hanser Publishers, Munich, Vienna, N.Y., Barcelona (1991), which is incorporated herein by reference.

In one embodiment, the composition contains a flame retardant, including, but not limited to, a metal hydrate, such as aluminum trihydroxide, magnesium dihydroxide, or combinations thereof.

Applications

The inventive compositions may be used for many applications, including, but not limited to, tires, hoses or tubes, belts, sheets, damping materials, rollers, seals, gloves, roofing materials, profiles, and sponges (or foams).

The foams of the present invention may be used in preparing any of a variety of articles or manufacture, or their component parts or portions. For purposes of illustration only, and not by way of limitation, such articles may be selected from the group consisting of profiles, belts, hoses, tubes, gaskets, membranes, molded goods, extruded parts, adhesives, building materials, construction materials, and automotive parts.

The compositions can be converted into a finished article of manufacture by any one of a number of conventional processes and apparatus. Illustrative processes include extrusion, calendering, injection molding, compression molding, and other typical thermoplastic processes.

Additional articles include automotive parts (for example, tires and tire components), computer parts, building materials, household appliances, electrical supply housings, trash cans, storage or packaging containers, lawn furniture strips or webbing, lawn mower, garden hose, and other garden appliance parts, refrigerator gaskets, acoustic systems, utility cart parts, desk edging, toys, footwear components, and water craft parts. The foams can also be used in roofing applications, such as roofing membranes. The foams can further be used in fabricating a footwear component, including, but not limited to, a shaft for a boot, particularly an industrial work boot. A skilled artisan can readily augment this list without undue experimentation.

DEFINITIONS

The term "composition," as used herein, includes a mixture of materials, which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, employed to refer to polymers prepared from only one type of monomer, and the term interpolymer as defined hereinafter.

The term "interpolymer," as used herein, refers to polymers prepared by the polymerization of at least two different types of monomers. The generic term interpolymer thus includes copolymers, employed to refer to polymers prepared from two different types of monomers, and polymers prepared from more than two different types of monomers.

The term "parts," in reference to an amount of a component, refers to the weight of a component in a composition.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

All the curing dynamics were measured by MDR (Moving Die Rheometer) measurements. Besides the curing curve (torque vs. time), other data, such as ts2, t10, t50 and t90 were recorded. Each sample was measured at 121° C., 177° C. and 200° C. The "ts2 value, measured at 121° C.," represents the anti-scorch property, and the higher this value, the better the anti-scorch property. The t90 values, measured at 177° C. and 200° C., represent the curing rate at 177° C. and 200° C., respectively, and the lower these values, the higher the curing rates (faster cure at the specified temperature).

Cure rate was measured according to ASTM D5289-07, on a Moving Die Rheometer (MDR (Rheometer MDR 2000 (Alpha Technologies)), at 177° C., for 30 minutes. The curing curve can be recorded, which is the relationship between the torque in units of "lb·in" of the sample and the cure time (minutes). Each test was run under ambient atmosphere, and about 5 grams green (or uncured) rubber) was used for each test.

Scorch, the result of premature crosslinking, was measured according to ASTM D5289-07, on a Moving Die Rheometer (MDR (Rheometer MDR 2000 (Alpha Technologies)), using changes in the torque over the course of a 30 minute period, at 121° C., under ambient atmosphere. About five grams of sample (green rubber) was used for each test.

The ML value and the MH value refer to the minimum torque and maximum torque, respectively, measured during a test, at the specified test temperature. The t10, t50, and t90 values are the time for the torque to change 10 percent, 50 percent and 90 percent, respectively, relative to the difference between MH and ML (or "MH−ML"). As discussed above, the "ts2 at 121° C." value represents the anti-scorch property (the higher the better), and is the time for the torque to increase two units (lb·in), relative to the ML value. The ML value and the MH value are generated by the rheometer.

The cure rate was obtained directly from the slope of the generated MDR curve by calculating the slope of the curve, as follows:

$$\text{Cure rate (lb·in/min)} = \frac{(MH - ML) \times 90\% - 2}{t90 - ts2}.$$

The ts2, t10, t50 and t90 values were measured in accordance with ASTM D5289-07.

The following examples illustrate, but do not, either explicitly or by implication, limit the present invention.

EXPERIMENTAL

Compounding

Each composition in Table 1, 3 and 5 was mixed using a HAAKE (RHEOMIX 600 from Thermo Electron Corporation) internal mixer, according to ASTM D3182-89. The EPDM, carbon black, paraffin oil, and zinc oxide (ZnO, used to primarily prevent the formation of sulfur-sulfur bonds in the crosslinked polymer structure) were mixed first at 80° C., for about five minutes, then the cure package (sulfur, PTC, primary accelerator) was added, and the resultant mixture was mixed for another three minutes to form a mixed green rubber. The rotation speed was 50 rpm. The mixed green rubber was conditioned for 24 hours at room temperature, before the rubber was analyzed by MDR.

The compositions in Tables 1, 3 and 5 were cured, and the cure parameters were measured, as shown in Table 2, 4 and 6. The curing profiles of Comparative Examples 1-2 and Inventive Examples 5-7 are shown in FIG. 1.

As shown in Table 2, the cure rates at 177° C. and 200° C. of Comparative Example 1, without the phase transfer catalyst (PTC), are much slower than the inventive compositions that contain a PTC (see Inventive Examples 5-9). Furthermore, the trialkyl methyl ammonium salt (Comparative Example 10 and 13) has a poor acceleration, as evident by the higher t90 values at 177° C. and 200° C., as compared to the tetra alkyl ammonium salt (see Inventive Example 5 and 6, respectively). The tetrabutyl ammonium salt has a higher acceleration (lower t90 (177° C. and 200° C.) and higher curing rate (200° C.)) than tributyl methyl ammonium salt. The tetraoctyl ammonium salt has a significantly higher acceleration (lower t90 (177° C. and 200° C.) and higher curing rate (177° C. and 200° C.)) than trioctyl methyl ammonium salt.

If PTC only has one alkyl group with a high carbon number (≥4 carbons), as in Comparative Example 12, the curing rate is not as fast as the "tetra alky (C≥4) ammonium salt accelerated cures," as shown in Examples 5 and 6. In addition to the number of alkyl group containing 4 or more carbon atoms, the number of carbon atoms per alkyl group also has big effect on the acceleration; the higher the number the better the effect. When the number of carbon atoms is greater than 4, the acceleration is significantly improved. When number of carbon atoms is less than 4, the acceleration is poor due to the poorer transferability of the curing agent (sulfur or sulfur complex) into the polymer (e.g., an EPDM). When the alkyl contains more than 4 carbon atoms, the transferability of the curing agent into the polymer plays an important role on acceleration. An increase in the transferability will accelerate the cure, and thus, increase the rate of cure. A fast cure rate is important because it leads to a reduced cycling time during the manufacture of a product formed from the cured composition, and to an increased productivity of the product.

As discussed above, FIG. 1 depicts the curing profiles (cure temperature of 177° C.), recorded by MDR, of several EPDM-based compositions, as noted in this figure. Each cure profile represents the relationship between the torque of the sample and its cure time. For a specified curing temperature, the torque will increase as the degree of crosslinking increases. A higher curing rate corresponds to a higher torque value in a shorter time period.

TABLE 1

Compositions of Inventive and Comparative Examples

| Compositions* | Comp. Ex. 1 | Comp. Ex. 2 | Comp Ex. 3 | Comp. Ex. 4 | Ex. 5 | Ex. 6 | Ex. 7 | Ex. 8 | Ex. 9 | Comp. Ex. 10 | Comp. Ex. 11 | Comp. Ex. 12 | Comp. Ex. 13 |
|---|---|---|---|---|---|---|---|---|---|---|---|---|---|
| NORDEL IP 5565 | 100 | 100 | 100 | 100 | 100 | 100 | 100 | 100 | 100 | 100 | 100 | 100 | 100 |
| Carbon Black N660 | 80 | 80 | 80 | 80 | 80 | 80 | 80 | 80 | 80 | 80 | 80 | 80 | 80 |
| Paraffin Oil SUNPAR 2280 | 50 | 50 | 50 | 50 | 50 | 50 | 50 | 50 | 50 | 50 | 50 | 50 | 50 |
| Zinc Oxide | 5 | 5 | 5 | 5 | 5 | 5 | 5 | 5 | 5 | 5 | 5 | 5 | 5 |
| Sulfur | 2 | 2 | 2 | 2 | 2 | 2 | 2 | 2 | 2 | 2 | 2 | 2 | 2 |
| 2-Mercaptobenzothiazole (MBT) | 1 | 1 | 1 | 1 | 1 | 1 | 1 | 1 | 1 | 1 | 1 | 1 | 1 |
| Tetramethyl ammonium bromide (TMAB) |  | 1 |  |  |  |  |  |  |  |  |  |  |  |
| Tetraethyl ammonium bromide (TEAB) |  |  | 1 |  |  |  |  |  |  |  |  |  |  |
| Tetra Propyl Ammonium bromide |  |  |  | 1 |  |  |  |  |  |  |  |  |  |
| Tetrabutyl ammonium bromide (TBAB) |  |  |  |  | 1 |  |  |  |  |  |  |  |  |
| Tetraoctyl ammonium bromide (TOAB) |  |  |  |  |  | 1 |  |  |  |  |  |  |  |
| Octyl pydinium chloride (OP) |  |  |  |  |  |  | 1 | 2 |  |  |  |  |  |
| 1-methyl-3-octyl imidazol chloride |  |  |  |  |  |  |  |  | 1 |  |  |  |  |
| Tri octyl methyl ammonium bromide |  |  |  |  |  |  |  |  |  | 1 |  |  |  |
| TriButyl methyl ammonium Bromide |  |  |  |  |  |  |  |  |  |  | 1 |  |  |
| DiButyl methyl ammonium Bromide |  |  |  |  |  |  |  |  |  |  |  | 1 |  |
| Hexadecyl trimethyl ammonium bromide |  |  |  |  |  |  |  |  |  |  |  |  | 1 |

*All amounts are in "parts."

TABLE 2

Cure Properties of the Examples of Table 1

| Compositions | Comp. Ex. 1 | Comp. Ex. 2 | Comp. Ex. 3 | Comp. Ex. 4 | Ex. 5 | Ex. 6 | Ex. 7 | Ex. 8 | Ex. 9 | Comp. Ex. 10 | Comp. Ex. 11 | Comp. Ex. 12 | Comp. Ex. 13 |
|---|---|---|---|---|---|---|---|---|---|---|---|---|---|
| ts2 (min) 121° C. | >30 | >30 | >30 | >30 | >30 | 23.6 | 25.3 | 21.8 | >30 | >30 | >30 | 28 | >30 |
| ts2 (min) 177° C. | 2.74 | 1.64 | 0.95 | 1.92 | 0.90 | 0.63 | 0.69 | 0.56 | 0.85 | 1.07 | 1.05 | 1.27 | 0.81 |
| t50 (min) 177° C. | 9.56 | 5.38 | 5.18 | 6.34 | 4.62 | 2.31 | 2.35 | 1.7 | 3.78 | 5.35 | 5.03 | 4.83 | 3.42 |
| t90 (min) 177° C. | 24.89 | 22.26 | 18.66 | 20.46 | 18.1 | 8.95 | 8.79 | 6.0 | 15.8 | 19.36 | 18.5 | 18.9 | 14.43 |
| ML (lb · in) 177° C. | 0.99 | 1.07 | 1.25 | 0.85 | 1.05 | 1.04 | 1.15 | 1.33 | 1.22 | 1.14 | 1.11 | 0.91 | 1.07 |
| MH (lb · in) 177° C. | 9.5 | 10.88 | 16.88 | 11.04 | 13.65 | 16.53 | 13.53 | 12.79 | 17.87 | 14.28 | 15.02 | 12.98 | 14.98 |
| Cure Rate at 177° C. | 0.26 | 0.33 | 0.68 | 0.39 | 0.54 | 1.44 | 1.13 | 1.53 | 0.87 | 0.54 | 0.6 | 0.5 | 0.77 |
| ts2 (min) 200° C. | 0.89 | 0.63 | 0.45 | 0.7 | 0.48 | 0.36 | 0.40 | 0.35 | 0.43 | 0.48 | 0.46 | 0.61 | 0.4 |
| t90 (min) 200° C. | 13.89 | 11.60 | 5.02 | 5.12 | 4.4 | 2.39 | 2.43 | 1.70 | 4.88 | 5.09 | 5.35 | 6.6 | 3.58 |
| ML (lb · in) 200° C. | 0.84 | 1.45 | 1.14 | 0.81 | 1 | 0.97 | 1.16 | 1.29 | 1.17 | 1.05 | 1.02 | 0.91 | 0.98 |
| MH (lb · in) 200° C. | 13.87 | 15.62 | 16.35 | 11.22 | 13.04 | 15.41 | 12.52 | 11.67 | 16.26 | 14.01 | 15.24 | 13.38 | 14.09 |
| Cure Rate at 200° C. | 0.75 | 0.98 | 2.55 | 1.67 | 2.25 | 5.42 | 4.05 | 5.44 | 2.6 | 2.1 | 2.2 | 1.54 | 3.08 |

Compositions with and without a secondary accelerator are shown in Table 3. The curing parameters for each composition are shown in Table 4.

TABLE 3

Comparison between the composition with and without secondary accelerator

| Compositions* | Ex. 14 | Ex. 15 | Ex. 16 | Comp. Ex. 17 | Comp. Ex. 18 | Comp. Ex. 19 |
|---|---|---|---|---|---|---|
| NORDEL IP 5565 | 100 | 100 | 100 | 100 | 100 | 100 |
| Carbon Black N660 | 80 | 80 | 80 | 80 | 80 | 80 |
| Paraffin Oil SUNPAR 2280 | 50 | 50 | 50 | 50 | 50 | 50 |
| Zinc Oxide | 5 | 5 | 5 | 5 | 5 | 5 |
| Sulfur | 2 | 2 | 2 | 2 | 2 | 2 |
| 2-Mercaptobenzo-thiazole (Primary accelerator) | 1 | 1 | 1 | 1 | 1 | 1 |
| ZDBC (secondary accelerator) |  |  |  | 1 | 1 | 1 |
| Tetrabutyl ammonium bromide (TBAB) | 1 |  |  | 1 |  |  |
| Tetraoctyl ammonium bromide (TOAB) |  | 1 |  |  | 1 |  |
| Octyl pydinium chloride (OP) |  |  | 1 |  |  | 1 |

*All amounts are in "parts."

TABLE 4

Cure Properties of the Examples in Table 3

| Compositions | Ex. 14 | Ex. 15 | Ex. 16 | Comp. Ex. 17 | Comp. Ex. 18 | Comp. Ex. 19 |
|---|---|---|---|---|---|---|
| ts2 (min) 121° C. | >30 | 23.6 | 25.3 | 6.95 | 5.49 | 2.48 |
| ts2 (min) 177° C. | 0.90 | 0.63 | 0.69 | 0.47 | 0.4 | 0.44 |
| t90 (min) 177° C. | 18.1 | 8.95 | 8.79 | 9.01 | 5.85 | 5.06 |
| ML (lb · in) 177° C. | 1.05 | 1.04 | 1.15 | 1.15 | 1.18 | 2.18 |
| MH (lb · in) 177° C. | 13.65 | 16.53 | 13.53 | 14.42 | 16.3 | 14.52 |
| Cure Rate at 177° C. | 0.54 | 1.44 | 1.13 | 1.16 | 2.13 | 1.97 |
| "ts2 (min) 121° C." × "Cure Rate at 177° C." | >>16.2 | 34 | 28.6 | 8.1 | 11.7 | 4.9 |

As shown in Table 4, the compositions containing the secondary accelerator, zinc dibutyl dithiocarbamate (ZDBC—see Comparative Examples 17-19), had low ts2 values at 121° C., which suggests poor anti-scorch property during compounding. The rubber compounding temperature is typically in the rage from 90° C.-120° C. Lower "ts2 at 121° C." values means that the composition is increasing in torque at a faster rate, and this indicates that the composition will more readily form premature crosslinks at the lower compounding temperatures. Premature crosslinks leads to scorch. Only the combination of PTC and primary accelerator (Inventive Examples 14-16) achieve a good balance between cure rate and anti-scorch resistance, as evident by the higher values of "ts2 at 121° C." and good cure rate at 177° C.

Compositions with and without a primary accelerator are shown in Table 5. The cure properties of the compositions are shown in Table 6.

TABLE 5

Comparison of Compositions with and without Primary Accelerator

| Compositions* | Comp. Ex. 20 | Comp. Ex. 21 | Comp. Ex. 22 | Ex. 23 | Ex. 24 | Ex. 25 |
|---|---|---|---|---|---|---|
| NORDEL IP 5565 | 100 | 100 | 100 | 100 | 100 | 100 |
| Carbon Black N660 | 80 | 80 | 80 | 80 | 80 | 80 |
| Paraffin Oil SUNPAR 2280 | 50 | 50 | 50 | 50 | 50 | 50 |

TABLE 5-continued

Comparison of Compositions with and without Primary Accelerator

| Compositions* | Comp. Ex. 20 | Comp. Ex. 21 | Comp. Ex. 22 | Ex. 23 | Ex. 24 | Ex. 25 |
|---|---|---|---|---|---|---|
| Zinc Oxide | 5 | 5 | 5 | 5 | 5 | 5 |
| Sulfur | 2 | 2 | 2 | 2 | 2 | 2 |
| MBT |  |  |  | 1 | 1 | 1 |
| Tetrabutyl ammonium bromide (TBAB) | 1 |  |  | 1 |  |  |
| Tetraoctyl ammonium bromide (TOAB) |  | 1 |  |  | 1 |  |
| Octyl pydinium chloride (OP) |  |  | 1 |  |  | 1 |

*All amounts are in "parts."

TABLE 6

Cure Properties of the Compositions in Table 5

| Compounds | Comp. Ex. 20 | Comp. Ex. 21 | Comp. Ex. 22 | Ex. 23 | Ex. 24 | Ex. 25 |
|---|---|---|---|---|---|---|
| ts2 (min) 121° C. | >30 | >30 | >30 | >30 | 23.6 | 25.3 |
| ts2 (min) 177° C. | 2.79 | 2.32 | 1.82 | 0.90 | 0.63 | 0.69 |
| t90 (min) 177° C. | 22.17 | 12.11 | 16.85 | 18.1 | 8.95 | 8.79 |
| ML (lb · in) 177° C. | 1.25 | 1.22 | 1.63 | 1.05 | 1.04 | 1.15 |
| MH (lb · in) 177° C. | 10.56 | 8.44 | 11.3 | 13.65 | 16.53 | 13.53 |
| Cure Rate at 177° C. | 0.33 | 0.46 | 0.44 | 0.54 | 1.44 | 1.13 |

As shown in Table 6, the compositions (Comparative Examples 20-22) without the primary accelerator (MBT), and with a PTC, did not achieve a fast cure rate, as evident by the lower curing rate at 177° C.

Although the invention has been described in detail in the preceding examples, this detail is for the purpose of illustration, and is not to be construed as a limitation on the invention as described in the following claims.

The invention claimed is:

1. A composition comprising at least the following:
A) interpolymer comprising, in polymerized form, ethylene, an α-olefin and a nonconjugated polyene;
B) sulfur;
C) at least one phase transfer catalyst (PTC) selected from the group consisting of—

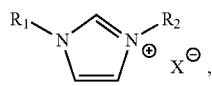
(3)

wherein R1 is an alkyl group having from 1 to 4 carbon atoms, R2 is an alkyl group having from 1 to 32 carbon atoms, and X is a halogen ion; and
D) at least one primary accelerator selected from the group consisting of the following:

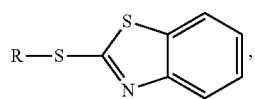
(a)

wherein R is H, or a heterocyclic substituent;

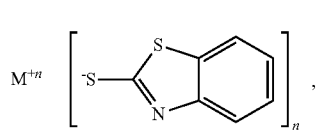
(b)

wherein M is $Zn^{2+}$, $K^+$, $Na^+$, $Cu^{2+}$ or an alkyl ammonium;

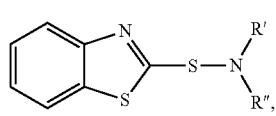
(c)

wherein R' and R" are each, independently, H, an alkyl, a cyclic alkyl, an aromatic, or a heterocyclic substituent, or wherein R' and R" together form a cyclic structure;

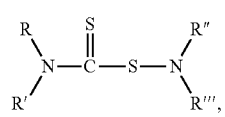
(d)

wherein R, R', R" and R'" are each, independently, H, an alkyl, a cyclic alkyl, an aromatic, or a heterocyclic substituent;
or wherein R and R' are each, independently, H, an alkyl, a cyclic alkyl, an aromatic, or a heterocyclic substituent, and R" and R'" together form a cyclic structure; or
wherein R" and R'" are each, independently, H, an alkyl, a cyclic alkyl, an aromatic, or a heterocyclic substituent, and R and R' together form a cyclic structure; or
wherein R" and R" together form a cyclic structure, and R and R' together form a cyclic structure;
and combinations thereof; and
wherein the composition has a cure rate, at 177° C., of greater than 0.8 lb·in/min.

2. The composition of claim 1, wherein the accelerator, Component D, is selected from the group consisting of the following:

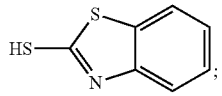

2-Mercaptobenzothiazole (MBT)

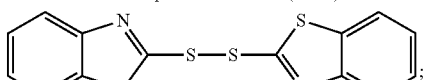

Dibenzothiazole disulfide (MBTS),

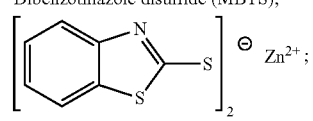

2-Mercaptobenzothiazole Zinc salt (ZMBT)

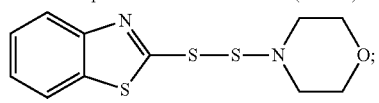

2-(4'-Morpholinodithio) benzothiazole (MDB)

-continued

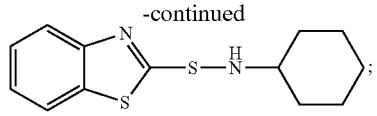
N-Cyclohexyl-2-benzothiazle sulfenamide (CBS)

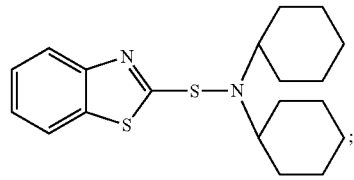
N,N-Dicyclohexyl-2-benzothiazole sulfenamide (DCBS)

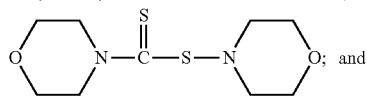
N-Oxydiethylene thiocarbamyl-N-oxydiethy sulfonamide (OTOS)

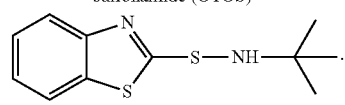
N-tertiarybutyl-2-benzothiazole sulfonamide (TBBS)

3. The composition of claim 1, wherein the interpolymer comprises, in polymerized form from 4 to 8 weight percent of the nonconjugated polyene.

4. The composition of claim 3, wherein the interpolymer is an EPDM.

5. The composition of claim 1, wherein the sulfur, Component B, is selected from an elemental sulfur, a polymeric sulfur, or a combination thereof.

6. The composition of claim 1, wherein the sulfur, Component B, is selected from the group consisting of powder sulfur, insoluble sulfur, surface treated sulfur, polymeric polysulfide, and sulfur olefin adducts.

7. The composition of claim 1, wherein the composition has a ts2 value at 121° C. of greater than 20 minutes.

8. The composition of claim 1, wherein the composition has a cure rate, at 200° C., of greater than 2.2 lb·in/min.

9. A cured polymer formed from the composition of claim 1.

10. An article comprising at least one component formed from the cured polymer of claim 9.

11. An article comprising at least one component formed from the composition of claim 1.

12. A composition comprising at least the following:
A) interpolymer comprising, in polymerized form, ethylene, an α-olefin and a nonconjugated polyene;
B) sulfur;
C) at least one phase transfer catalyst (PTC) selected from the group consisting of the following:

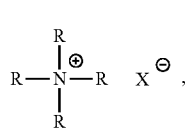
(1)

wherein each R group is, independently, an alkyl group having from 4 to 32 carbon atoms, and X is a halogen ion;

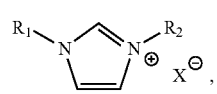
(3)

wherein R1 is an alkyl group having from 1 to 4 carbon atoms, R2 is an alkyl group having from 1 to 32 carbon atoms, and X is a halogen ion; and
combinations of (1) and (3); and
D) at least one primary accelerator selected from the group consisting of the following:

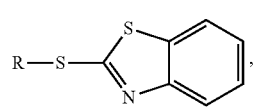
(a)

wherein R is H, or a heterocyclic substituent;

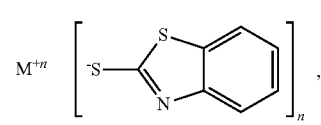
(b)

wherein M is $Zn^{2+}$, $K^+$, $Na^+$, $Cu^{2+}$ or an alkyl ammonium;

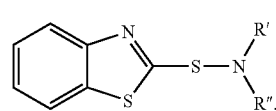
(c)

wherein R' and R" are each, independently, H, an alkyl, a cyclic alkyl, an aromatic, or a heterocyclic substituent, or wherein R' and R" together form a cyclic structure;

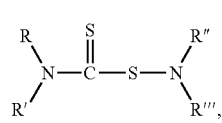
(d)

wherein R, R', R" and R'" are each, independently, H, an alkyl, a cyclic alkyl, an aromatic, or a heterocyclic substituent; or wherein R and R' are each, independently, H, an alkyl, a cyclic alkyl, an aromatic, or a heterocyclic substituent, and R" and R'" together form a cyclic structure; or wherein R" and R'" are each, independently, H, an alkyl, a cyclic alkyl, an aromatic, or a heterocyclic substituent, and R and R' together form a cyclic structure; or wherein R" and R'" together form a cyclic structure, and R and R' together form a cyclic structure;
and combinations thereof; and
wherein the composition has a cure rate, at 177° C., of greater than 0.8 lb·in/min.

13. The composition of claim 12, wherein the accelerator, Component D, is selected from the group consisting of the following:

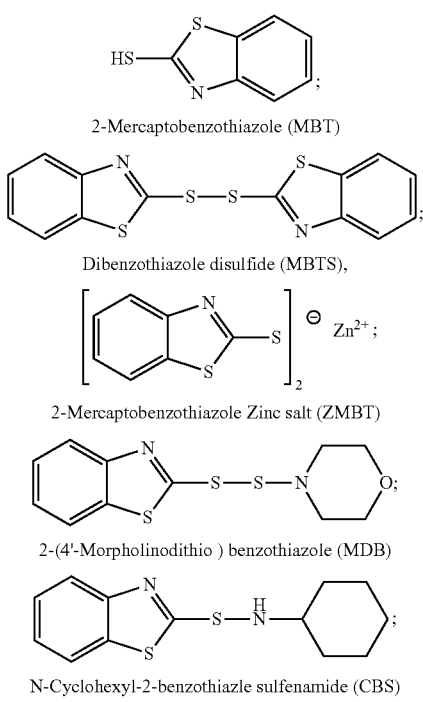

2-Mercaptobenzothiazole (MBT)

Dibenzothiazole disulfide (MBTS),

2-Mercaptobenzothiazole Zinc salt (ZMBT)

2-(4'-Morpholinodithio) benzothiazole (MDB)

N-Cyclohexyl-2-benzothiazle sulfenamide (CBS)

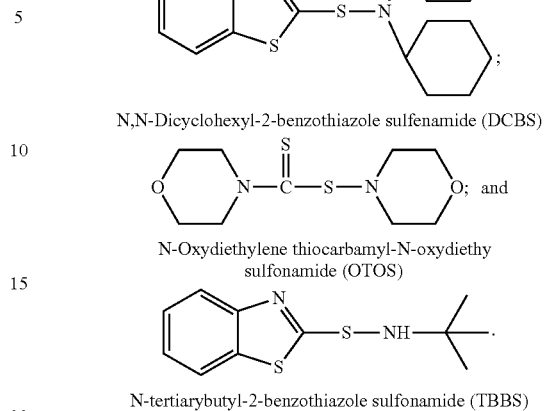

N,N-Dicyclohexyl-2-benzothiazole sulfenamide (DCBS)

N-Oxydiethylene thiocarbamyl-N-oxydiethy sulfonamide (OTOS)

N-tertiarybutyl-2-benzothiazole sulfonamide (TBBS)

14. The composition of claim 12, wherein the interpolymer is an EPDM.

15. The composition of claim 12, wherein the sulfur, Component B, is selected from an elemental sulfur, a polymeric sulfur, or a combination thereof.

16. An article comprising at least one component formed from the composition of claim 12.

\* \* \* \* \*